(12) United States Patent
Mendenhall et al.

(10) Patent No.: US 8,221,565 B2
(45) Date of Patent: Jul. 17, 2012

(54) COMBUSTION INHIBITOR COATING FOR GAS GENERANTS

(75) Inventors: Ivan V. Mendenhall, Providence, UT (US); Gary K. Lund, Malad City, ID (US); Brett Hussey, Bountiful, UT (US)

(73) Assignee: Autoliv ASP, Inc., Ogden, UT (US)

( * ) Notice: Subject to any disclaimer, the term of this patent is extended or adjusted under 35 U.S.C. 154(b) by 312 days.

(21) Appl. No.: 12/534,617

(22) Filed: Aug. 3, 2009

(65) Prior Publication Data
US 2011/0025030 A1 Feb. 3, 2011

(51) Int. Cl.
*C06B 45/00* (2006.01)
*C06B 45/18* (2006.01)
*D03D 23/00* (2006.01)
*D03D 43/00* (2006.01)

(52) U.S. Cl. .......... 149/3; 149/2; 149/108.8; 149/109.4; 149/109.6

(58) Field of Classification Search ............ 149/3, 2, 149/108.8, 109.4, 109.6
See application file for complete search history.

(56) References Cited

U.S. PATENT DOCUMENTS

| | | | | |
|---|---|---|---|---|
| 4,632,813 A | * | 12/1986 | Anastasi et al. | 423/310 |
| 5,034,070 A | * | 7/1991 | Goetz et al. | 149/3 |
| 5,345,873 A | * | 9/1994 | Lauritzen et al. | 102/290 |
| 5,682,013 A | * | 10/1997 | Smith et al. | 149/6 |
| 5,985,361 A | * | 11/1999 | Poulter et al. | 427/230 |
| 6,502,513 B1 | * | 1/2003 | Barnes et al. | 102/289 |
| 6,620,266 B1 | * | 9/2003 | Williams et al. | 149/3 |
| 6,673,173 B1 | * | 1/2004 | Mendenhall et al. | 149/45 |
| 2007/0296190 A1 | * | 12/2007 | Hussey et al. | 280/741 |

OTHER PUBLICATIONS

International Search Report and Written Opinion of the International Searching Authority for International Application No. PCT/US10/43718, mailed Sep. 3, 2010.

* cited by examiner

*Primary Examiner* — James McDonough
(74) *Attorney, Agent, or Firm* — Sally J. Brown; Harness Dickey & Pierce PLC (57) ABSTRACT

Methods of making and resultant compositions thereof, which include a gas generant having a coating including an inorganic combustion inhibitor. Such coated gas generants are useful in pyrotechnic compositions and ignition materials, and may be employed, for example, in inflatable restraint systems. The ratio of coated and uncoated gas generant bodies within an airbag inflator may be tailored to provide S-curve inflation performance. Spray application of aqueous mixture including the combustion inhibitor onto the gas generant body provides a rapid way to achieve a thin but robust coating.

17 Claims, 4 Drawing Sheets

COMBUSTION INHIBITOR COATING FOR GAS GENERANTS

FIELD

The present disclosure generally relates to ignitable compositions, such as gas generant compositions used in inflatable restraint systems, and more particularly to combustion inhibitor coatings for gas generant compositions.

INTRODUCTION

The statements in this section provide background information related to the present disclosure and may not constitute prior art.

Passive inflatable restraint systems are used in a variety of applications, such as motor vehicles. Some types of passive inflatable restraint systems minimize occupant injuries by using a pyrotechnic gas generant to inflate an airbag cushion (e.g., gas initiators and/or inflators) or to actuate a seatbelt tensioner (e.g., micro gas generators), for example. Automotive airbag inflator safety requirements and performance needs continually increase in order to further enhance passenger safety.

In some applications, airbag inflators exhibiting a sigmoidal relationship of pressure versus time are desired. This sigmoidal performance, known as an "S-curve," provides a more gentle initial deployment of the airbag (lower rate of inflation) followed by a rapid stiffening of the cushion in the later stages of the deployment event. The initially lower rate of inflation, represented by the portion of the curve before the inflection point in a plot of pressure over time, can provide additional protection to occupants who may be undersized or out of position when a collision occurs.

Methods for achieving S-curve performance include the use of dual stage inflators, and use of progressive burning gas generant grains, for example. Unfortunately, dual stage inflators can be more complex and expensive. In certain aspects, plastic coatings or other materials delivered in an organic solvent carrier to the gas generant may delay combustion; however undesirably contribute to undesirable gas effluents during combustion and airbag deployment. Further, the use of organic solvents in the manufacturing process for such plastics and organic materials requires scrubbing systems and upgrades of equipment and electrical classification to ensure safe handling.

As such, there is a need for methods and compositions that provide S-curve performance while also addressing manufacturing, cost, and performance considerations.

SUMMARY

In various aspects, the present disclosure provides a gas generant having a combustion inhibitor coating covering at least a portion of a surface of the gas generant. The gas generant optionally contains a fuel component and an oxidizer component. The coating comprises an inorganic combustion inhibitor selected from the group consisting of inorganic phosphate, inorganic polyphosphate, salts, and combinations thereof. In certain embodiments, an inflatable restraint device includes an airbag for restraining motion of a vehicle occupant and a gas generant, such as that described above.

In certain aspects, a gas generant is provided that comprises a coating disposed over a portion of a surface of a gas generant material. The coating comprises a co-crystal of an inorganic combustion inhibitor and at least one component present in the gas generant material.

In yet other aspects, methods of forming gas generants are provided. In certain aspects, a method of coating a gas generant comprises applying an aqueous mixture comprising a solubilized inorganic combustion inhibitor to at least a portion of a surface of a gas generant material comprising a fuel component and an oxidizer component. The aqueous mixture applied to the surface is dried to form a coating on at least a portion of the surface for inhibiting combustion.

BRIEF DESCRIPTION OF THE DRAWINGS

The present disclosure will become more fully understood from the detailed description and the accompanying drawings, wherein.

DETAILED DESCRIPTION

Further areas of applicability will become apparent from the description provided herein. It should be understood that the description and specific examples are intended for purposes of illustration only and are not intended to limit the scope of the present technology. The citation of references herein does not constitute an admission that those references are prior art or have any relevance to the patentability of the technology disclosed herein. All references cited in the "Detailed Description" section of this specification are hereby incorporated by reference in their entirety.

"A" and "an" as used herein indicate "at least one" of the items is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all distinct values and further divided ranges within the entire range.

Gas generants are used to provide pressure or inflation for various applications such as inflatable restraint devices and systems, airbag module assemblies, side impact inflators, seatbelt tensioners, hybrid inflators, aircraft slides, inflatable boats, and inflatable lifesaving buoy devices, and other similar applications. In addition, inflatable restraint devices and systems are used in multiple applications within automotive vehicles, such as driver-side, passenger-side, side-impact, curtain, and carpet airbag assemblies. Other types of vehicles including, for example, boats, airplanes, and trains may use inflatable restraints and other types of safety or protective devices may employ various forms of inflatable restraint devices and systems.

The present technology provides methods and compositions directed to gas generant tablets having coated regions. Such a coating comprises an inhibitor compound that desirably delays combustion of the gas generant material. Coating gas generant tablets with a combustion inhibitor delays ignition and flame spread to the surface of the gas generant, which desirably provides S-curve performance. In certain aspects, such coated gas generants are combined with uncoated gas generants in an inflatable restraint device to further tailor desired S-curve performance in an inflator device having an air bag. In various aspects, a coating may be aqueous-based and the inhibitor compound(s) may be soluble in water or aqueous mixtures, inorganic, and non-toxic. Furthermore, in certain aspects, use of such inorganic inhibitor(s) does not contribute to undesirable gas effluents.

Figure 1:
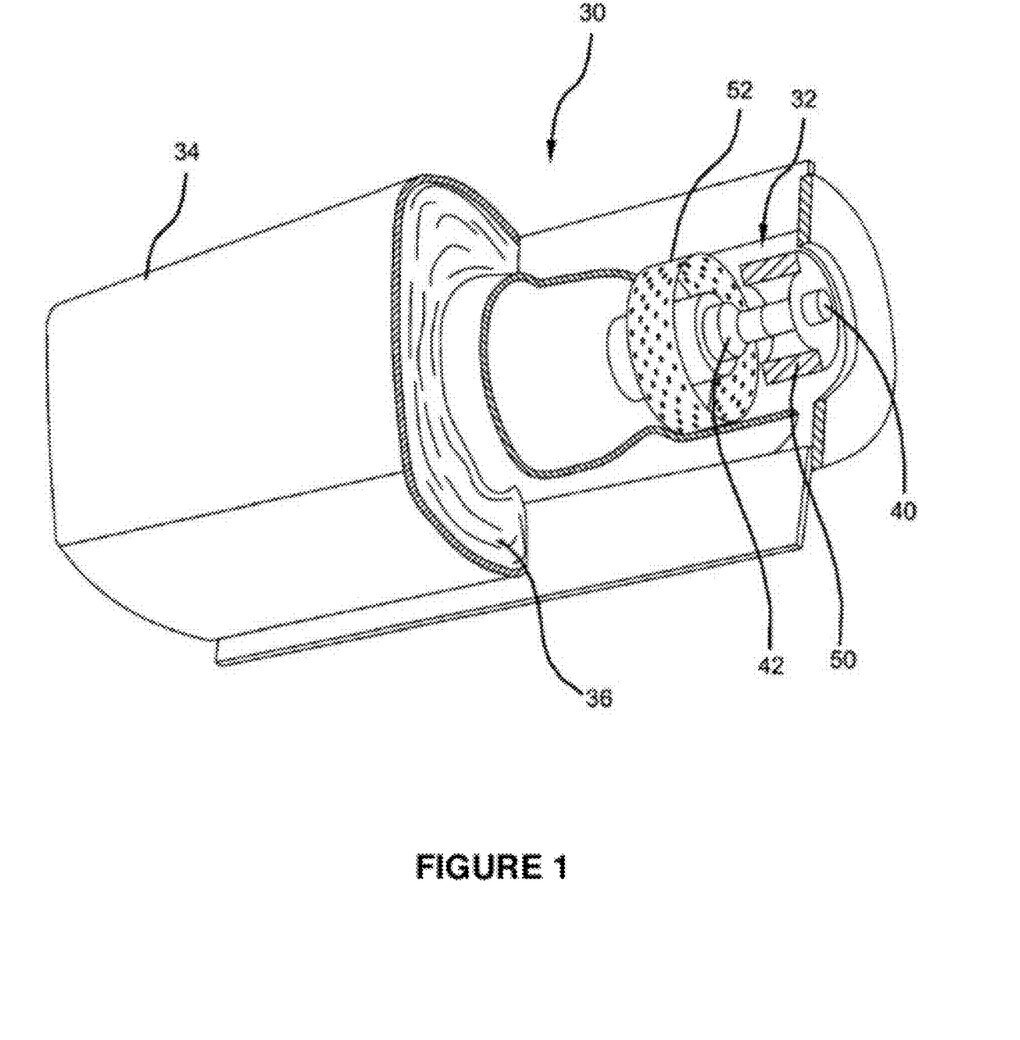
FIG. 1 is a partial cross-sectional view of an embodiment of a passenger-side airbag module including an inflator for an inflatable airbag restraint device.

With reference to FIG. 1, a typical automotive airbag module 30 includes a passenger compartment inflator assembly 32 and a covered compartment 34 to store an airbag 36. Such devices often use a squib or initiator 40 that is electrically ignited when rapid deceleration and/or collision is sensed. The discharge from the squib 40 usually ignites an initiator or igniter material 42 that burns rapidly and exothermically, in turn igniting a gas generant material 50. The gas generant material 50 burns to produce the majority of gas products that are directed to the airbag 36 to provide inflation.

Inflatable restraint devices typically involve a series of reactions that facilitate production of gas in order to deploy an airbag or actuate a piston. In the case of airbags, for example, actuation of the airbag assembly system and ignition of the gas generant may inflate the airbag cushion within a few milliseconds. In some cases, it is desirable to provide a variable gas output rate; for example, where combustion starts with a lower rate of gas output during the initial few milliseconds (e.g., about 5 to about 25 milliseconds) followed by a higher rate of gas output for the remainder of the inflation cycle. Such dual gas output rates can reduce the initial loading on the airbag system components and may decrease the injury potential for an out of position occupant; e.g., a small child not properly positioned in the path of a deploying airbag.

In some instances, it is desirable to employ a gas generant that can provide what is termed "S-curve" performance, referring to the shape of the pressure versus time curve in a closed tank into which the airbag inflator is deployed. In S-curve deployment, the initial pressure rise in the tank is gentler and more gradual compared to standard designs, with the inflation performance catching up later in operation. The shape of the pressure trace is sigmoidal in character, exhibiting an inflection point, where the trace resembles a stretched-out letter "S," hence the name. This performance results in gentle airbag deployment during the early stages of a vehicle collision. Slower initial restraint forces can reduce the possibility of injuries that may occur when an occupant is too close to the airbag; e.g., the condition referred to as out-of-position (OOP). Towards the later stages of the collision, the airbag rapidly stiffens by gas generated to provide the proper restraint for the occupant.

S-curve performance may be realized by employing a variety of methods, such as: (1) design of the gas generant body geometry so that surface area increases as the burn progresses, referred to as "progressive geometry"; (2) use of dual stage inflators where the stages are deployed in a staggered sequence; and (3) inhibiting or delaying combustion of a portion of a plurality of gas generant bodies, so that as the burn progresses, more bodies become involved in combustion to effectively increase the combustion surface area at later stages of the burn.

From a cost standpoint, manufacture of gas generant bodies with progressive geometry can be expensive due to specialized equipment required to make such intricate shapes, whether via extruders or hydraulic presses. Dual-stage inflators are also more expensive than single-stage inflators due to redundancy in inflator components requiring more equipment and control systems. While plastic resins can be applied to the surface of a gas generant by using volatile organic solvents, such spraying operations involve volatile organic solvents, which can then be released into the air. Environmental regulations often limit the amount (if any) and type of organic solvent that can be released into the atmosphere; therefore, spray-coating operations employing organic solvents usually require additional systems to scrub the solvent from the air and to properly handle such regulated organic solvent compounds. Moreover, processing equipment may have to be upgraded in order to meet electrical codes required to accommodate volatile organic solvents, many of which are flammable and can potentially present handling hazards.

Application of organic plastic and resin type coatings to the gas generant also introduces undesirable amounts of additional organic matter to the overall gas generant/inflator composition. Introduction of such organic material to the combustion chamber of the inflator can potentially result in increased levels of noxious effluents, such as carbon monoxide, nitrogen oxides, and ammonia gas. Therefore, use of plastic and resinous inhibiting materials may require compensation by using additional oxidizing agent in the gas generant material composition, leading to increased flame temperatures and undesirable effluents. It is therefore advantageous to utilize a combustion inhibiting material which does not contribute to the effluent emissions of the gas generant while simultaneously meeting certain functional goals previously outlined, advantageously in an economical manner.

Additionally, it is desirable to have relatively thin layers of a coating, because minimal thicknesses of the inert material coatings keep the inflator envelope size to a minimum. Thus, conventional pressing methods for applying coatings tend to have a coating that is too thick and/or undesirably low throughput during processing.

The present technology addresses these issues by providing compositions, methods, apparatuses, and systems relating to gas generants and ignition materials, where at least one region of a surface of a gas generant or ignition material has a coating that comprises an inorganic combustion inhibitor to delay the gas generant combustion reaction. For example, the combustion inhibitor coating comprising one or more inorganic combustion inhibitor compounds may be applied to one or more regions of a surface of a gas generant body by spray-coating the surface with an aqueous mixture containing dissolved inorganic combustion inhibitor, which is then dried. In certain aspects, substantially all of the surface of the gas generant is coated. In yet other aspects, discrete regions of the surface of the gas generant are coated, where certain regions may remain uncoated. Furthermore, while the discussion herein describes a single coating layer, the present teachings contemplate a plurality of coating layers, which may have the same or different compositions, or discrete regions of coatings having different compositions, as may be desired to tailor gas generant performance.

In this regard, such coated gas generant(s) may be used for generating gas for various inflation applications where a slower initial inflation rate is desired, for example where S-curve performance is desired. The coated gas generant may be used in pyrotechnic compositions, autoignition compositions, mixed with other gas generant compositions, and used in squibs and igniter cans. In certain variations, the coated gas generant may be the primary combustible gas generant in the system.

The present gas generant includes a coating disposed on at least a portion of a surface of a gas generant body that inhibits, delays, restricts, or retards the combustion of at least a portion of the gas generant material for a certain time period. In certain aspects, a mixture of distinct gas generants may be employed, where one or more gas generants are at least partially coated and are combined with one or more uncoated gas generant bodies. The mixture of coated and uncoated gas generants may provide a dual gas output rate, initially having a lower rate of gas output of the gas generant, followed by a subsequent higher rate of gas output. The delay in combustion products output can improve the loading on the airbag components, for example, and reduce potential issues with an out-of-position occupant during bag deployment.

A coating that includes an inorganic combustion inhibitor covers at least a portion of a surface of a body of the gas generant material. In certain aspects, a combustion inhibiting coating includes a co-crystal form of the inorganic combustion inhibitor component(s) and one or more components present at the surface of the gas generant material. For example, where the combustion inhibitor compound is substantially water-soluble or hydrophilic, such as certain inorganic compounds and is applied to the gas generant surface via an aqueous mixture, it can solubilize or interact with water-soluble or hydrophilic compounds present in the gas generant material, such that one or more co-crystalline forms are generated in the inhibitor coating. For example, in certain aspects, a co-crystal is a crystalline entity which includes more than one molecular substance incorporated into a unit cell, for example, a multi-component molecular crystal. Thus, in various aspects, a co-crystal contains two or more non-identical, distinct molecules, where the two or more molecules generally have a non-ionic association between them. Such a coating comprising a co-crystal form of the inorganic combustion inhibitor component(s) and one or more components of the gas generant material may optionally cover substantially all of the of the gas generant body.

In various aspects, the coating adhesion is robust and durable to the point that very little, if any, of the coating is abraded or separated when the coated gas generant body is physically agitated or shaken. For example, in certain aspects, less than about 0.05% by weight of the coating separates from/falls off during a shaking test in a Ro-Tap® sieve shaker device, as described in the examples herein.

In various aspects, the combustion inhibitor compound is selected to have high water solubility and has combustion inhibition/flame retardant properties. By "water-soluble," it is generally meant that at least about 1% by weight of the inorganic compound dissolution in a given amount of water, optionally, in certain aspects at least about 10% to about 20% by weight of the compound is soluble in water. The combustion inhibitor compound selected desirably has minimal contribution to undesirable gaseous effluents and particulate during an airbag deployment. Particularly suitable combustion inhibitor compounds include inorganic phosphates and phosphate salts, such as ammonium phosphate. For example, the water solubility of ammonium phosphate allows it to be applied using water as the carrier/solvent. The use of inorganic solvents, in particular water, thus eliminates the need for expensive scrubber systems to remove volatile organic solvents from the airstream or the need for upgrading the electrical classification of the processing equipment. For example, the water solubility of an inorganic combustion inhibitor, such as ammonium phosphate, may further allow it to co-crystallize with one or more water-soluble components that are present in the gas generant materials (on the surface), creating a strong bond between the combustion inhibitor, coating and the surface of the gas generant body.

Suitable combustion inhibitors include water-soluble inorganic phosphates, inorganic polyphosphates, salts thereof, and combinations thereof. Examples of suitable combustion inhibitor compounds include various ammonium and metal salts of phosphates, including metals such as sodium, potassium, and calcium, including compounds such as disodium phosphate, trisodium phosphate, pentasodium triphosphate, hexasodium metaphosphate, tetrasodium pyrophosphate, where sodium in each case may be replaced with one or more of ammonium and/or metal cations, such as sodium ammonium phosphate. A particularly suitable combustion inhibitor is ammonium phosphate and even more particularly, monoammonium phosphate. Other combustion inhibitor compounds include water-soluble silicates such as sodium silicate, water-soluble antimonates, such as sodium antimonate, and water-soluble borates such as ammonium metaborate or pentaborate.

In certain aspects, a combination of inorganic combustion inhibitor compounds may be employed in the coating. Further, in certain aspects, the coating may contain other conventional ingredients. For example, in addition to the inorganic combustion inhibitor, the coating may also comprise one or more colorants. In this regard, gas generants having coated surfaces including colorants may be readily identified, particularly in embodiments where a combination of gas generants (including coated and uncoated) are used. For example, suitable colorants optionally include colored metal oxides such as iron oxide and/or cupric oxide.

The gas generant material defining a body that may be in a shape selected from the group consisting of: a grain, a pellet, a tablet, a wafer, a washer, or other geometry as known in the art or combinations thereof. In certain embodiments, the coating of combustion inhibitor may completely cover one or both faces and/or sides of a gas generant tablet, or the coating may cover less than the entire expanse or face of the gas generant grain or tablet. Examples include those where the inhibitor coating covers one wafer face surface and/or a continuous annular coating layer on the outer, intermediate, and/or inner periphery surface(s) of a washer-shaped gas generant body.

In certain embodiments, a gas generant includes at least one fuel component and at least one oxidizer component. In addition to the fuel and oxidizer components, the gas generant material composition may further include one or more binders, coolants, slag forming agents, a colorant, and other gas generant additives as known in the art, as well as combinations thereof. For example, exemplary suitable gas generant material include those described in U.S. Pat. No. 6,143,102 to Mendenhall et al., incorporated herein by reference in its entirety.

The present technology may be used as an ignition material, propellant, gas-generating material, and pyrotechnic material. The gas generant may be in the form of a solid grain, a pellet, a tablet, or the like. Often, a slag or clinker is formed near the gas generant during burning. The slag/clinker serves to sequester various particulates and other compounds generated during combustion. A filter may be provided between the gas generant and airbag in order to remove particulates entrained in the gas and to reduce temperature of the gases prior to entering the airbag.

Suitable fuel components for use in the gas generant include: boron, zirconium, titanium hydride, silicon, guanidine derivatives, tetrazoles, bitetrazoles, guanylurea derivatives, copper complexes and guanylurea derivatives, cyclotrimethylenetrinitramine (RDX), octahydro-1,3,5,7-tetranitro-1,3,5,7-tetrazocane (HMX), and other nitrogen-containing compounds. Additional examples of fuel components include: tetrazole salts, such as aminotetrazole and mineral salts of tetrazole; 1,2,4-triazole-5-one; guanidine nitrate; nitro guanidine; amino guanidine nitrate; metal nitrates; and the like. These fuels may be categorized as gas generant fuels due to their relatively low burn rates and are often combined with one or more oxidizers in order to achieve desired burn rates and gas production.

In certain embodiments, the fuel component may be a non-azide nitrogen-containing fuel compound, such as an organic fuel, including one or more of guanidine nitrate, nitroguanidine, aminoguanidine nitrate, diaminoguanidine nitrate, triaminoguanidine nitrate, guanylurea nitrate, tetrazoles, bitetrazaoles, azodicarbonamide and mixtures thereof. Particular non-azide nitrogen-containing fuel compounds include guanidine nitrate and hexamine cobalt III nitrate. Use of guanidine nitrate in gas generant compositions is generally based on a combination of factors relating to cost, thermal stability, availability, and compatibility with other composition components.

Suitable oxidizers for use in the gas generant include: alkali, alkaline earth, and ammonium nitrates, nitrites, chlorates and perchlorates, metal oxides, basic metal nitrates, transition metal complexes of ammonium nitrate, iodates, permanganates, metal peroxides, metal hydroxy nitrates, and combinations thereof. The oxidizer may be selected, along with a fuel, such as a copper-oxalyldihydrazide complex and/or additional fuel component(s), to form a gas generant that upon combustion achieves an effectively high burn rate and gas yield from the fuel. Specific examples of suitable oxidizers include basic metal nitrates such as basic copper nitrate. Basic copper nitrate has a high oxygen-to-metal ratio and good slag forming capabilities upon burn. Such oxidizing agents may be present in an amount of less than or equal to about 50% by weight of the gas generant composition.

Additional examples of oxidizers include water-soluble oxidizing compounds, such as for example, ammonium nitrate, sodium nitrate, strontium nitrate, potassium nitrate, ammonium perchlorate, sodium perchlorate, and potassium perchlorate. Also included are ammonium dinitramide and perchlorate-free oxidizing agents. The composition may include combinations of oxidizers, such that the various oxidizers may be nominally considered as including a primary oxidizer, a second oxidizer, and the like.

The present gas generants may further include one or more additives, such as binders, coolants, and slag forming agents. The binder component may comprise hydrophilic binders, including hydrophilic film formers and/or cellulosic derivatives, thermosetting binders, or thermoplastic binders. In certain aspects, the binder component is selected to provide a hydrophilic surface to the gas generant, for example, a hydrophilic film forming cellulosic derivative like hydroxypropyl cellulose. In certain aspects, a polymeric binder material can be used to impart sufficient cohesive properties to the composition to make the composition extrudable. Extrudable compositions in accordance with certain embodiments may include or contain about 1 to about 20 weight percent of such a polymeric binder component. Suitable binder matrices and associated non-energetic binders, plasticizers, and stabilizers, include those as disclosed in U.S. Pat. No. 6,689,236 to Taylor et al., the relevant portions of which are incorporated herein by reference.

Further examples of suitable binder materials include hydrophilic binders like cellulosics, natural gums, polyacrylates, polyacrylamides, polyurethanes, polybutadienes, polyvinyl alcohols, polyvinyl acetates, and combinations of two or more thereof. More particularly, suitable cellulosic binder materials may include ethyl cellulose, carboxymethyl cellulose, hydroxylpropyl cellulose and combinations of two or more thereof. Suitable natural gum binder materials may include guar, xanthan, arabic and combinations of two or more thereof. Incorporation of binder materials, such as the above-described cellulosic binders, may result in or form compositions that burn at lower temperatures. These "cooler burning" materials may be preferable for certain applications.

The gas generant composition may include a coolant in order to reduce the flame temperature of the gas generant composition, for example. In practice, the composition may include a coolant in the range of up to about 20 weight percent. Suitable coolants include, but are not limited to, oxalic acid, ammonium oxalate, oxamide, ammonium carbonate, calcium carbonate, basic copper carbonate, magnesium carbonate, and combinations thereof.

Additional additives such as slag forming agents, flow aids, plasticizers, viscosity modifiers, pressing aids, dispersing aids, or phlegmatizing agents may also be included in the composition in order to facilitate processing of the gas generant bodies or to provide enhanced properties. For example, compositions may include a slag forming agent such as a metal oxide; e.g., aluminum oxide or silicon dioxide. Generally, such additives may be included in the present compositions in an amount of about 1 to about 5 weight percent.

Suitable slag and viscosity modifying/promoting agents include cerium oxide, ferric oxide, zinc oxide, aluminum oxide, silicon dioxide, titanium oxide, zirconium oxide, bismuth oxide, molybdenum oxide, lanthanum oxide, combinations thereof, and the like. Such redox inert oxides may be employed individually or as mixtures of two or more individual components. For example, where one oxide has a very fine form (e.g., particle size of less than about 20 nm) useful for improving viscosity of a mixture slurry, another coarser oxide having larger particle sizes may be provided to the mixture to improve slagging properties without interfering with or negatively affecting burning rate.

Pressing aids may also be added to the gas generant composition prior to tableting or pressing and include compounds such as calcium or magnesium stearate, graphite, molybdenum disulfide, tungsten disulfide, boron nitride, and mixtures thereof.

In some embodiments, one or more of the materials or components included in the gas generant may serve more than one role or function. For example, binder materials may also act or function as a fuel component, as described herein. Thus, specific range limits for particular materials that may be included in the present compositions are generally dependent, at least in part, on what other particular materials are included. Ranges for particular materials can be identified by those skilled in the art and guided by the teachings provided herein.

In certain embodiments, the present technology provides an inflator device with an air bag that uses a gas generant having a combustion inhibitor coating on at least one region of a surface thereof. In certain variations, the present gas generants coated with inorganic combustion inhibitor may be used with or combined with other known pyrotechnic compositions. In certain aspects, a mixture of distinct gas generants may be used to tailor inflator performance. For example, a gas generant mixture for an inflator may include a first gas generant uncoated and a second coated gas generant. Such a gas generant mixture can be employed in an airbag for restraining motion of a vehicle occupant (to provide inflation of such an airbag). For example, referring again to FIG. 1, the air bag module 30 may use a gas generant material 50 that is a gas generant mixture comprising uncoated and coated gas generant bodies. A coated gas generant body includes a first fuel component and a first oxidizer component with a coating that covers at least a portion of the surface of the gas generant to form a coated surface. The coating includes an inorganic combustion inhibitor as described above. A second uncoated gas generant includes a second fuel component and a second oxidizer component. In some cases, the first and second fuel components may be the same material and/or the first and second oxidizer components may be the same material.

In certain embodiments, the gas generant mixture may include a plurality of uncoated gas generants and a plurality of coated gas generants. A ratio of uncoated gas generants to coated gas generants may be tailored to generate various degrees of S-curve performance of combustion pressure versus time. For example, the ratio of uncoated gas generants to coated gas generants may be adjusted from about 10:90 by weight to about 30:70 by weight. In some cases, the ratio may be adjusted so that the mixture desirably provides S-curve performance where the inflection point of the combustion pressure versus time curve lies between about 10 milliseconds and about 30 milliseconds. In this regard, inflator performance can be tailored in a relatively facile manner.

The present technology further provides low cost methods for applying an inhibitor to a gas generant body surface by using a spray coating method. An inert inorganic or substantially inorganic combustion inhibitor compound is dissolved in an aqueous mixture, which includes water. In certain variations, an aqueous mixture may comprise water as the only vehicle or carrier in the mixture. The aqueous mixture may be an aqueous solution in certain embodiments.

In certain variations, the present disclosure provides a method of coating a gas generant includes applying an aqueous mixture comprising a solubilized inorganic combustion inhibitor (or optionally a plurality of inorganic combustion inhibitors) to at least a portion of a surface of a gas generant body. The gas generant body is defined by a material comprising a fuel component and an oxidizer component. The gas generant having the sprayed aqueous mixture is dried to form a coating of the inorganic combustion inhibitor on at least a portion of the surface. As discussed above, in certain aspects, applying the aqueous mixture to the surface may solubilize one or more components present in the gas generant material at the surface so that when dried, a co-crystal morphology is formed with of one or more components of the gas generant and the inorganic combustion inhibitor forming such a co-crystal. For example, a portion of the fuel component (e.g., guanidine nitrate) on the surface of the body may be solubilized upon application of the aqueous mixture. The resulting coating may therefore include co-crystals of the formerly solubilized portion of the fuel component and the combustion inhibitor; e.g., co-crystals of guanidine nitrate and ammonium phosphate.

The following examples illustrate methods to make, characterize, and evaluate the properties of a gas generant having a combustion inhibitor coating in accordance with the present technology.

EXAMPLE 1

Monoammonium phosphate in the amount of 25 grams is dissolved in 75 mL of water to form an aqueous mixture and placed inside a spray bottle. Approximately 50 grams of gas generant tablets having a diameter of about 0.25 inches (6.4 mm) and a thickness of about 0.080 inches (2 mm) are placed inside of a perforated stainless steel cylinder or drum of a rotating device. Standard tablets have an exemplary gas generant material comprising guanidine nitrate, basic copper nitrate, aluminum oxide, and silicon dioxide. The drum is placed horizontally on a rotating device that rotates the barrel around its longitudinal axis. The interior of the drum is equipped with baffles that continually move the gas generant tablets as the drum rotates. The walls of the drum have perforations that are smaller than the gas generant tablets but allow flow of a heated stream of air through the barrel as it rotates, facilitating rapid drying of the inhibitor solution on the surface of the tablets.

Coating is performed by placing the gas generant tablets inside the drum and manually spraying (with a spray bottle) the monoammonium phosphate solution through the drum opening onto the bed of tablets. A stream of heated air is directed through the sides of the drum during this operation. The rates of drum rotation and spray application and the velocity of the heated air are all adjusted so that the tablets do not become saturated with the aqueous mixture and stick to the sides of the drum during application of the aqueous mixture containing the combustion inhibitor. After the application is complete, the coated tablets are placed inside an oven and dried at 80° C. The amount of inhibitor coating applied is measured by determination of the phosphate content and is about 1%, which is merely exemplary.

The coated and dried tablets are then subjected to a vibration test to determine the adhesive strength of the combustion inhibitor coating. In this test, the coated tablets are carefully weighed, placed onto a 25 mesh screen (screen size of about 707 μm), which is placed inside a Ro-Tap® sieve shaker device that violently shakes the tablets for a period of about 5 minutes. During the shaking operation, if any combustion inhibitor coating separates and comes off the surface of the tablet, it passes through the screen and is caught in a pan. After shaking, the tablets are weighed again and the percent weight loss is attributed to the loss of inhibitor coating material, since uncoated tablets lose essentially 0% of their weight after the shaking operation. With respect to the present Example 1 having ammonium phosphate coated tablets, about 0.04% weight loss occurs after shaking, indicating very good adhesion of the combustion inhibitor coating.

Figure 2:
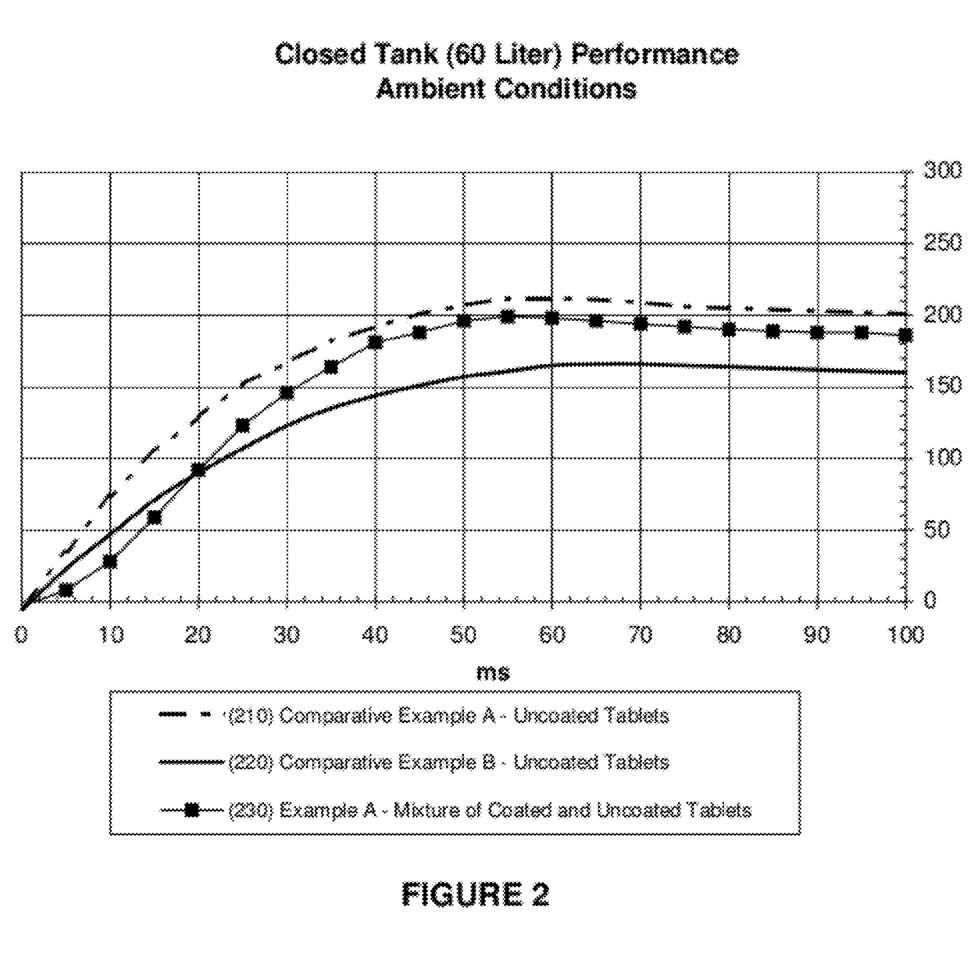
FIG. 2 graphically depicts pressure versus time following ignition of a generant composition using two tablet configurations of uncoated gas generant tablets and a configuration that includes both coated and uncoated gas generant tablets.

For comparison, FIG. 2 shows pressure versus time performance of various gas generants that are separately ignited in a driver inflator to generate tank curves in a 60 liter closed tank. First, Example A includes a mixture of distinct gas generant compositions, specifically having a plurality of uncoated gas generant tablets and a plurality of coated gas generant tablets in an ambient tank. Comparative uncoated gas generants are also tested (Comparative Examples A and B). In FIG. 2, Comparative Example A generates curve 210 with 37 grams of uncoated 0.25 inches (6.4 mm) diameter tablets that are about 0.060 inches (1.5 mm) thick. Likewise, Comparative Example B generates curve 220 by using 35 grams of uncoated 0.25 inches (6.4 mm) diameter tablets that are about 0.070 inches (1.8 mm) thick. By varying the thickness of the tablets and the load of the comparative Examples A and B, the rise rate and maximum pressure achieved can be varied, as shown in FIG. 2, but the shapes of curves 210 and 220 are generally the same. Curve 230, however, is generated by Example A, which is a mixture of 1) 28 grams gas generant tablets having a diameter of about 0.25 inches (6.4 mm) and a thickness of about 0.070 inches (1.8 mm) coated with combustion inhibitor and 2) 9 grams of uncoated tablets of the same dimensions. Curve 230 has a distinctly different shape characterized by an inflection point at about 20 milliseconds, providing what is referred to as an "S-curve." The curve 230 exhibits a gentler initial inflation rate in the first 20 to 30 ms as compared to the uncoated tablet curves 210, 220.

EXAMPLE 2

To further illustrate advantages of the present technology, gas generants having polymeric coatings and solvent applied coatings are prepared in accordance with the technique discussed in Example 1 and compared with a gas generant embodiment having a combustion inhibitor coating comprising ammonium phosphate as the inorganic combustion inhibitor. The Ro-Tap® sieve shaker device and mesh screen, as described above, is used to perform vibration tests to ascertain the relative strength of various polymeric coatings compared to the present inorganic combustion inhibitor coating. Five comparative examples of polymer igniter coatings are prepared and tested, where solid igniter particles are suspended in an organic solvent with a dissolved polymeric binder. The solvent solution is then sprayed onto the surface of gas generant tablets and subjected to the vibration test in the Ro-Tap® sieve shaker device. Results are provided in terms of weight loss experienced by the coated tablets following the vibration test.

Five polymer coated examples are prepared as follows for purposes of comparison (where solid igniter material particles comprise titanium hydride and potassium perchlorate that are suspended in a solvent in which a polymeric binder is dissolved). Comparative Example C includes the igniter material particles and 0.80% hydroxypropyl cellulose dissolved in 100 mL of ethanol, which is applied at about 2.9% w/w level to the surface of 0.25 inches×0.080 inches (6.4 mm×2 mm) tablets. The tablets are formed of a gas generant material including guanidine nitrate, basic copper nitrate, aluminum oxide, and silicon dioxide to form a polymeric coating. Weight loss from the coated Comparative Example C after the sieve shaker test is 27.12%. Comparative Example D includes the same igniter material particles mixed with 2% hydroxypropyl cellulose dissolved in 100 mL of ethanol, which is applied at about 4.4% w/w level to the surface of tablets described above, having dimensions of 0.25 inches× 0.080 inches (6.4 mm×2 mm). The weight loss after the sieve shaker test is 1.97%. Comparative Example E includes the same igniter material particles mixed with 3.5% Viton B™ (fluoropolymer) dissolved in 100 mL of butyl acetate, which is applied at 3.81% w/w level to the surface of tablets like those in Comparative Example C having dimensions of 0.25 inches×0.080 inches (6.4 mm×2 mm). The weight loss after the sieve shaker test is 8.85%. Comparative Example F includes the same igniter material particles and 4.0% Viton B™ (fluoropolymer) dissolved in 100 mL of butyl acetate, which is applied to the surface of the tablets like those of Comparative Example C described above (having dimensions of 0.25 inches×0.080 inches (6.4 mm×2 mm)) at 3.74% w/w level. The weight loss after the sieve shaker test is 8.63%. Comparative Example G includes the same igniter material particles mixed with 4.5% Viton B™ (fluoropolymer) dissolved in 100 mL of butyl acetate, which is applied to the surface of the tablets like those of Comparative Example C (having dimensions of 0.25 inches×0.080 inches (6.4 mm×2 mm)) at 3.83% w/w level. The weight loss after the sieve shaker test is 6.74%.

Thus, the polymer coated tablets of Comparative Examples C-G experience coating material losses ranging from 1.97% up to 27.12%. As noted above, the combustion inhibitor coating including ammonium phosphate from Example 1 loses only about 0.04% weight under the same shaking conditions. Hence, none of the polymeric coatings approach the robustness and adhesion of the exemplary embodiment of the present inorganic combustion inhibitor coating. Accordingly, the present technology provides an advantageously hard, durable, and robust coating.

Figure 3:
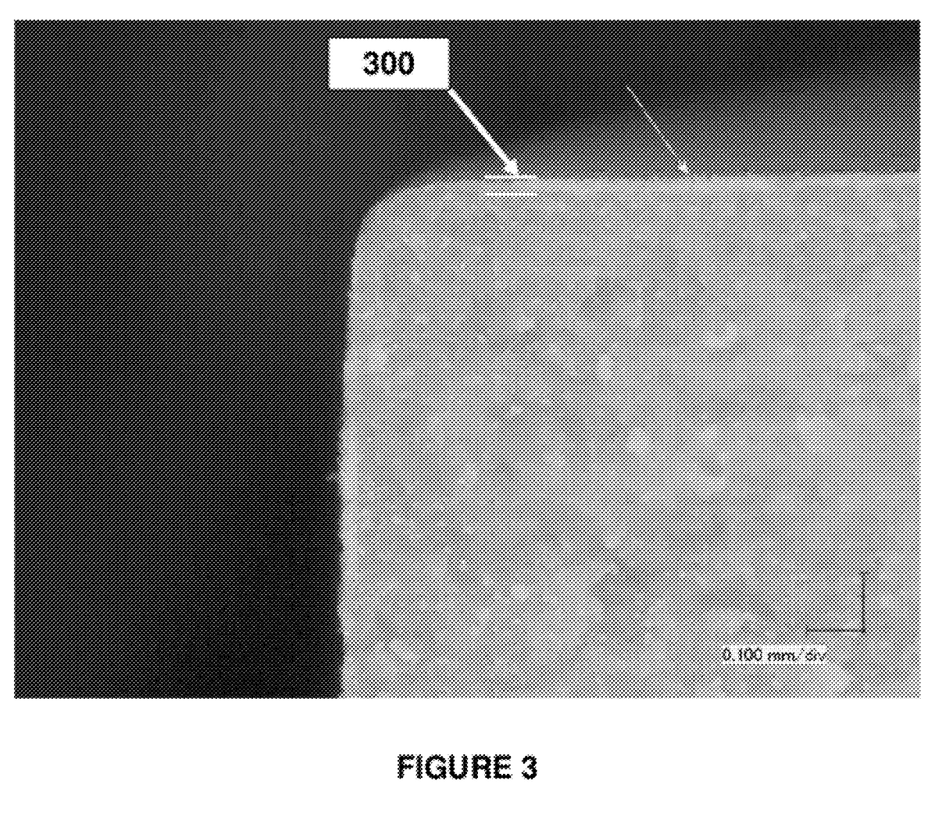
FIG. 3 is a photograph of an exemplary embodiment of a coated gas generant tablet, where the tablet is cut in cross-section, showing the coating layer on the tablet surface and the tablet interior.

As such, the present combustion inhibitor coatings and coating methods can provide thin, but strong coatings. With reference to FIG. 3, a photograph is provided of a tablet with an inhibitor coating comprising ammonium phosphate, cut to show the tablet in cross-section. The photograph shows a thin coating of combustion inhibitor on the surface of the gas generant tablet, indicated by the arrow 300. Without being bound by any particular theory, it is believed that application of the aqueous mixture including the combustion inhibitor serves to partially dissolve one or more water-soluble components of the gas generant body so that upon drying the combustion inhibitor and gas generant component(s) co-crystallize to form a hard and durable combustion inhibitor coating.

Figure 4:
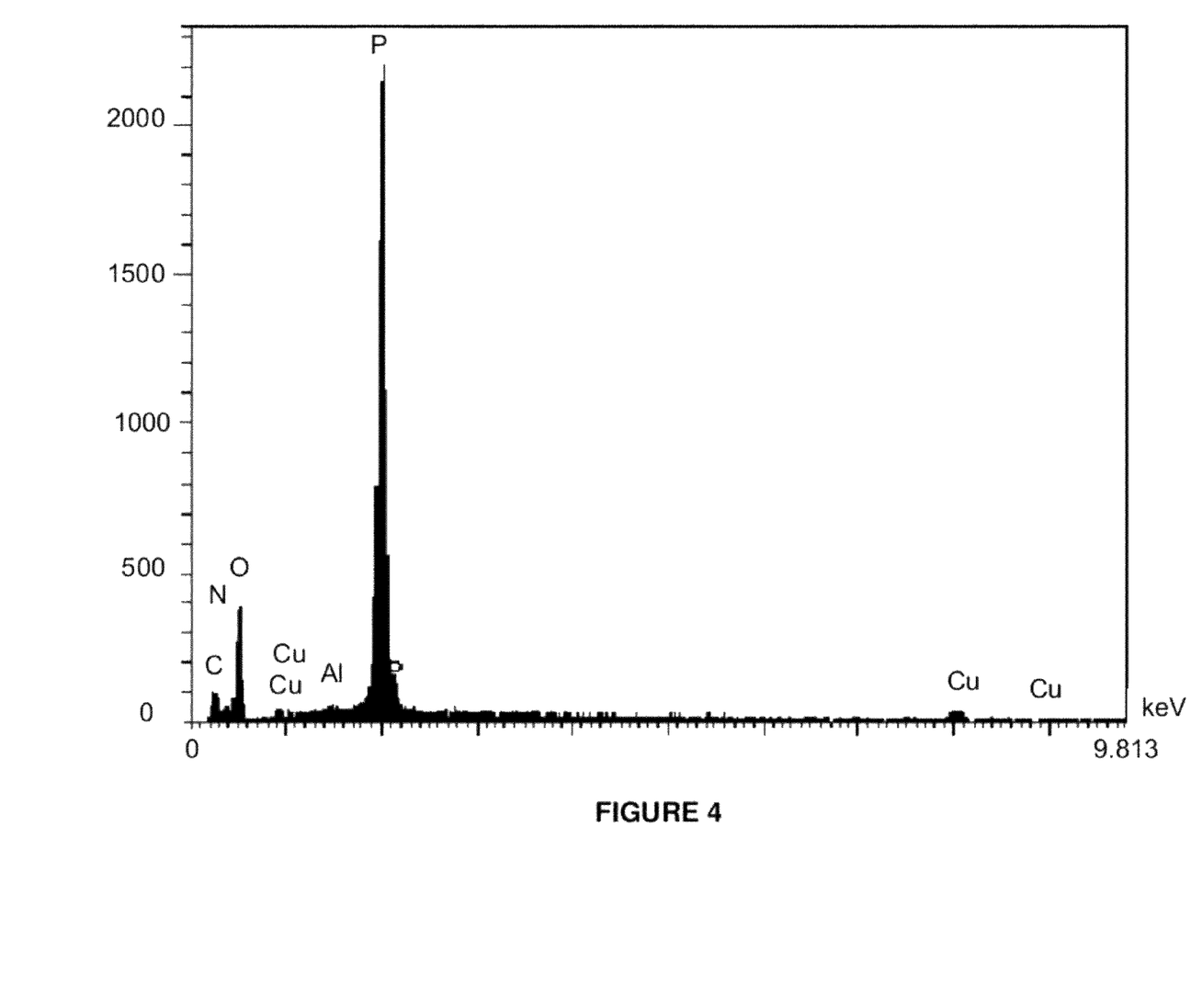
FIG. 4 graphically depicts Energy Dispersive X-ray Fluorescence (EDAX) analysis of crystals from the coated surface of an exemplary embodiment of a coated gas generant tablet.

With reference to FIG. 4, Energy Dispersive X-ray Fluorescence (EDAX) analysis of the crystals on the surface of the gas generant tablet appears to confirm co-crystallization of the combustion inhibitor (ammonium phosphate in this example) with part of the gas generant material composition (components from the surface regions). The predominant peaks present are phosphorus, oxygen, nitrogen, and carbon, the source of which are the ammonium phosphate coating and co-crystallized guanidine nitrate (a fuel component) from the gas generant material.

The present coated gas generants may be employed in various apparatuses and systems including inflators, inflation systems, and inflation methods. For example, an airbag inflator or a gas generator may include a plurality of pyrotechnic bodies in the form of grains or tablets that comprise a gas generant or propellant formulation, such as an azide-free composition, that have the present combustion inhibitor coating. The gas generant body has a coating on at least a portion of its surface where the coating includes an inert ignition or burn inhibitor or retardant material. The combustion inhibitor-coated gas generant is disposed in a combustion chamber of the gas generator or inflator and used to produce a gas upon combustion, which after typically filtering out condensed-phase products, inflates an airbag to serve as a vehicle occupant restraint cushion during a collision. Some or all of the gas generant bodies are partially to fully coated with one or more combustion inhibitor materials, such as ammonium phosphate, which may be applied to the bodies by spraying using an aqueous-based vehicle, for example.

The present coated gas generant and mixtures including the gas generant may further include one or more oxidizers, fuels, and may include other additives, where upon ignition the composition combusts rapidly to form gaseous reaction products (e.g., $CO_2$, $H_2O$, and $N_2$). Rapid combustion releases heat and gaseous products, where the heated inflation gas can be directed to an inflatable restraint device or used to actuate a piston, for example. The gas generant may comprise a redox-couple having at least one fuel component. Depending on whether the fuel component is fully or self-oxidized, or under-oxidized, the composition may include one or more oxidizing components, where the oxidizing component reacts with the fuel component(s) in order to generate the gas product.

The present methods and compositions provide several non-limiting benefits and advantages. In particular, these include: (1) simple, low cost application, where for example, a production process using an aqueous mixture of combustion inhibitor (e.g., monoammonium phosphate) can be applied with a pharmaceutical-type pan coater that reliably coat high throughputs; (2) elimination of volatile organic solvents in the application process, obviating facility modifications and equipment upgrades typically required to handle volatile organic solvents, and also being friendlier to the environment; (3) improved gas effluents by elimination of carbon-based plastics in the inhibitor coating (where carbon in plastic inhibitors is potentially converted to carbon monoxide during combustion) and (4) providing gas generants and mixtures having S-curve performance, by way of example.

The examples and other embodiments described above are not intended to be limiting in describing the full scope of compositions and methods of this technology. Equivalent changes, modifications and variations of specific embodiments, materials, compositions, and methods may be made within the scope of the present disclosure with substantially similar results.

What is claimed is:

1. A gas generant comprising:
a fuel component and an oxidizer component; and
a coating covering at least a portion of a surface of the gas generant, wherein the coating comprises an inorganic combustion inhibitor selected from the group consisting of inorganic phosphate, inorganic polyphosphate, salts, and combinations thereof, wherein the coating comprises a co-crystal of one or more components of a material forming a body of the gas generant and the inorganic combustion inhibitor.

2. The gas generant of claim 1, wherein the inorganic combustion inhibitor is water-soluble.

3. The gas generant of claim 1, wherein the inorganic combustion inhibitor comprises ammonium phosphate.

4. The gas generant of claim 1, wherein a gas generant material defines a body having a shape of a grain, a pellet, a tablet, a wafer, or a washer.

5. The gas generant of claim 1, wherein the coating covers substantially all of the surface of the gas generant.

6. The gas generant of claim 1, wherein the gas generant further comprises a member selected from the group consisting of: a binder, a coolant, a slag forming agent, a colorant, and combinations thereof and the coating optionally further comprises a colorant.

7. A gas generant comprising a coating disposed over a portion of a surface of a gas generant material, wherein the coating comprises a co-crystal of an inorganic combustion inhibitor and at least one component present in the gas generant material.

8. The gas generant of claim 7, wherein said at least one component present in the body material is selected from the group consisting of: an oxidizer component, a fuel component, and combinations thereof.

9. The gas generant of claim 7, wherein said inorganic combustion inhibitor is selected from the group consisting of inorganic phosphate, inorganic polyphosphate, salts, and combinations thereof.

10. The gas generant of claim 7, wherein the inorganic combustion inhibitor component comprises ammonium phosphate.

11. The gas generant of claim 7, wherein the inorganic combustion inhibitor is water-soluble.

12. A method of coating a gas generant comprising:
applying an aqueous mixture comprising a solubilized inorganic combustion inhibitor to at least a portion of a surface of a gas generant material comprising a fuel component and an oxidizer component; and
drying the aqueous mixture applied to the surface to form a coating on at least a portion of the surface for inhibiting combustion, wherein the coating comprises a co-crystal of one or more components of the gas generant material and the inorganic combustion inhibitor.

13. The method of claim 12, wherein the aqueous mixture solubilizes one or more components of the gas generant material applied thereto, and the drying forms the coating comprising the co-crystal of one or more components of the gas generant material and the inorganic combustion inhibitor.

14. The method of claim 12, wherein the inorganic combustion inhibitor comprises a member selected from the group consisting of inorganic phosphate, inorganic polyphosphate, salts, and combinations thereof.

15. The method of claim 12, wherein the inorganic combustion inhibitor comprises ammonium phosphate.

16. The method of claim 12, wherein the gas generant further comprises a member selected from the group consisting of: a binder, a coolant, a slag forming agent, a colorant, and combinations thereof.

17. A gas generant comprising:
a gas generant body having a first composition comprising a fuel component and an oxidizer component, wherein the gas generant body defines a surface; and
a coating covering at least a portion of the surface of the gas generant body, wherein the coating comprises a second composition distinct from the first composition, wherein the second composition comprises an inorganic combustion inhibitor selected from the group consisting of inorganic phosphate, inorganic polyphosphate, salts, and combinations thereof, wherein less than or equal to about 0.05% by weight of the coating separates from the gas generant body after five minutes of a sieve shaker test.

* * * * *